United States Patent

[11] 3,629,924

[72] Inventor Milton C. Everett
  Nassau County, N.Y.
[21] Appl. No. 742,206
[22] Filed July 3, 1968
[45] Patented Dec. 28, 1971
[73] Assignee Kastar, Inc., New York

[54] BAND CLAMP
  24 Claims, 4 Drawing Figs.
[52] U.S. Cl................................................ 29/224,
  81/9.3
[51] Int. Cl........................................... B23p 15/10
[50] Field of Search.................................. 29/222,
  224, 229, 269; 24/19, 68.1, 68.2;
  74/405, 625; 81/9.3; 254/59, 66

[56] References Cited
UNITED STATES PATENTS

| | | | |
|---|---|---|---|
| 2,208,136 | 7/1940 | Miller..................... | 29/222 |
| 1,963,436 | 6/1934 | Dumke................... | 29/222 X |
| 2,494,963 | 1/1950 | Ray......................... | 81/9.3 |
| 2,541,360 | 2/1951 | Hull......................... | 74/405 |
| 2,600,394 | 6/1952 | Conklin.................. | 81/9.3 |
| 3,376,628 | 4/1968 | Kyser...................... | 29/222 |

Primary Examiner—Granville Y. Custer, Jr.
Assistant Examiner—J. C. Peters
Attorneys—Lackenbach and Lackenbach ABSTRACT: Continuously adjustable worm driven band clamp provided with rapid takeup and release particularly adapted for use as a ring compressor.

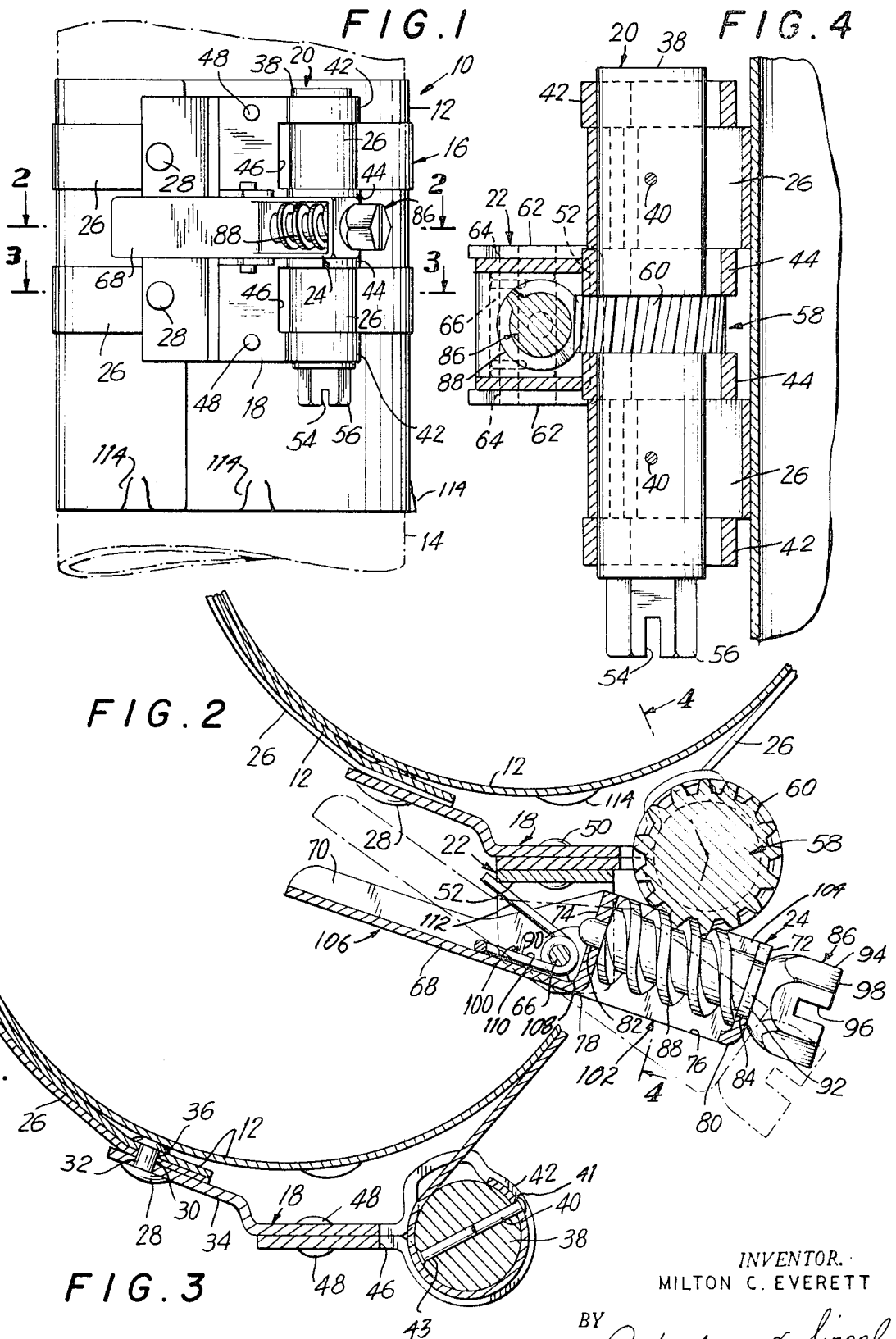

BAND CLAMP

This invention relates to band clamps and, more particularly, to band clamps constructed and arranged for utilization as piston ring compressors.

Band type clamps are utilized as piston ring compressors to compress piston rings into the grooves of a piston preparatory to assembly of the piston with a cylinder.

Such band type clamps and ring compressors have heretofore been suggested utilizing a shaft supported in a bearing assembly and one or more straps connected with the bearing assembly and the shaft so that upon rotation of the shaft the strap or straps will be wound thereupon to effect a change in circumference with releaseable ratchet one-way clutch means being provided between the bearing assembly and the shaft to maintain strap tension after tightening.

Such band-type clamps or ring compressors as described above, and other ring compressors such as are known in the prior art have not, however, been entirely satisfactory since they were not generally capable of continuous adjustments, capable of being rapidly adjusted for use upon pistons of widely diverse sizes, did not provide sufficient mechanical advantage to enable firm tightening to be accomplished easily and/or required complex or time consuming re-setting after removal from one piston and before application to a subsequent piston.

Having in mind each and every one of the foregoing, it is a primary object of the present invention to provide novel and improved band-type clamp sturctures and apparatus.

Another primary object of the present invention, in addition to the foregoing object, is the provision of such band-type clamps constructed and arranged for particular utility as piston ring compressors.

Yet another primary object of the present invention, in addition to each of the foregoing objects, is the provision of such clamps which may be rapidly and easily adjusted to widely diverse sizes.

Yet still further, it is another primary object of the present invention, in addition to each of the foregoing objects, to provide such clamps which may be rapidly and easily tightened.

Another and still further primary object of the present invention, in addition to each of the foregoing objects, is the provision of such clamps which may be rapidly and easily released or expanded.

Another and yet still further primary object of the present invention, in addition to each of the foregoing objects, is the provision of such clamps which provide a substantial mechanical advantage to enable firm and complete constriction and tightening thereof with a minimum of effort.

In addition to each of the foregoing objects, it is yet another primary object of the present invention to provide such clamps which will not inadvertently be released.

Yet further, in addition to the foregoing objects, it is another primary object of the present invention to provide such clamps which may be readily operated without requiring the utilization of special tools.

Yet still further, it is another primary object of the present invention, in addition to each of the foregoing objects, to provide such clamps which are long-lasting and durable while being yet simple and easy to manufacture.

Yet still further, it is another primary object of the present invention, in addition to each of the foregoing objects, to provide such clamps which are simple and easy to use and capable of a wide range of continuous adjustments.

Yet still further, in addition to each of the foregoing objects, it is yet still another primary object of the present invention to provide such clamps with novel worm drive and ratcheting means.

The invention resides in the combination, construction, arrangement and disposition of the various component parts and elements incorporated in improved band-type clamps constructed in accordance with the principles of the present invention. This invention will be better understood when consideration is given to the following details and description which, when taken in conjunction with the annexed drawing, describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIG. 1 is a side elevational view of a ring compressor constructed in accordance with the principles of the present invention;

FIG. 2 is a top cross-sectional partial view taken along line 2–2 of FIG. 1;

FIG. 3 is a top cross-sectional plan, partial view taken along line 3–3 of FIG. 1; and FIG. 4 is an elevational cross-sectional view taken along line 4–4 of FIG. 2.

With reference now to the drawing, there is shown and illustrated new and improved ring compressor apparatus constructed in accordance with the principles of the present invention and designated generally by the reference character 10 which comprises a band 12 adapted to be disposed generally circumferentially about, for example, a piston 14 and a band-type clamp assembly 16 for constricting the band 12, as will be described in more detail hereinafter.

The band-type clamp 16 may, in turn, comprise a bearing assembly or bracket 18, a worm gear assembly 20 rotationally carried thereby, a pivot bracket 22 structurally associated with the bearing assembly or main bracket 18, a worm screw bracket 24 pivotally associated with the pivot bracket 22, and one or more elongated straps 26 structurally associated with the bearing assembly or main bracket 18 and worm gear assembly 20 as hereinafter more fully described.

One end portion of the strap 26 may be secured with the bearing assembly or main bracket 18, as by means of rivets 28 extending through holes 30 provided adjacent one end portion thereof and holes 32 provided in a flange portion 34 of the bearing assembly or main bracket 18. The rivets 28 may also be utilized to structurally associate one end portion of the band 12 with the bearing assembly or main bracket 18 as by extending the rivets 28 to pass through holes 36 provided adjacent one end portion of the band 12.

The worm gear assembly 20 may comprise a worm gear shaft 38 secured with the main bearing assembly or bracket 18 for rotation relative thereto, as by means of straps 42 and 44. The straps 26 may be secured, as by means of rivets 40 extending through apertures 41 and 43 provided in the straps 26 and worm gear shaft 38, respectively. Accordingly, upon rotation of the worm gear assembly 20, the end portions of the straps 26 will be wound about the worm gear shaft 38, decreasing the free length of the straps 26 and, accordingly, decreasing the circumference circumscribed thereby and constricting the band 12 about the piston 14.

The worm gear shaft 38 may be supported for rotation by, for example, outer and inner bearing portions 42 and 44, respectively of the bearing assembly or main bracket 18. For example, the bearing portions 42 and 44 may comprise strap portions defined by the outer margins of the bearing assembly or main bracket 18 and a plurality of generally rectangular apertures 46 provided therein, the straps being formed into generally cylindrical configuration, as shown, around the worm gear shaft 38 and secured in such position by, as means of outer and inner rivets 48 and 50, respectively, extending through the overlapping portions of the bearing assembly or main bracket 18, as shown. The inner rivets 50 may further extend through the base 52 of the pivot bracket 22 (see FIG. 2) to secure the pivot bracket 22 relative to the bearing assembly or main bracket 18.

As heretofore pointed out, the straps 26 may be secured at one end portion thereof with the bearing assembly or main bracket 18, as by means of rivets 28 and at the other end portions with the worm gear shaft 38, as by rivets 40. The end portions secured with the worm gear shaft 38 may, for example, be disposed generally within the rectangular apertures 46, that is, between the outer and inner bearing portions 42 and 44 of the bearing assembly or main bracket 18. The worm gear shaft 38 may be provided with means, such as, for example, a screw slot 54 and/or hexagonal portion 56 to enable the shaft 38 to be directly rotated, as by means of a screwdriver, wrench, or the like, to wind the straps 26 thereon or unwind the straps 26 therefrom.

The worm gear assembly 20 may further comprise a worm gear 58 structurally associated with the worm gear shaft 38, for example, generally medially thereof. The worm gear 58 may be secured with the worm gear shaft 38 for rotation therewith in substantially any desired manner, for example, by means of set screws, rivets, press fitting, braising, welding, staking, or the like, or may be integrally formed therewith, as by stamping, forging, machining, or the like. The worm gear 58 may, for example, comprise a plurality of helical teeth 60 disposed about the periphery thereof.

The worm gear 58 may be of substantially any desired thickness, for example, extending generally entirely between the inner bearing portions 44 to retain the worm gear assembly 20 against axial movement relative to the bearing assembly or main bracket 18.

The pivot bracket 22, as heretofore pointed out, may be structurally associated with the main bracket or bearing assembly 18 by means, such as the rivets 50 extending through the base 52 of the pivot bracket 22 and the bearing assembly or main bracket 18. The pivot bracket 22 may be of generally U-shaped configuration comprising, for example, in addition to the base portion 52 a pair of generally rectangular arms 62 extending substantially perpendicularly outwardly of the base portion 52. Accordingly, the arms 62 will be generally parallel to each other and to the sides of the worm gear 58.

Each of the arms 62 of the pivot bracket 22 may be provided with an aperture 64 extending therethrough. The apertures 64 may be generally axial alignment with each other and, there may be disposed therein a pivot pin 66 which, accordingly, will extend between the arms 62 of the pivot bracket 22 and upon which the worm screw bracket 24 may be pivotally supported, as will be described in more detail hereafter.

The worm screw bracket may, for example, be formed of sheet metal so as to comprise a back wall 68, a pair of side walls 70, an end wall 72 and a central wall 74. The back wall 68 may, for example, be provided with a generally rectangular aperture 76 formed by folding a portion thereof along a fold line 78 to a substantially right angle bend to define the central wall 74. Similarly, the end wall 72 may be formed by folding a generally rectangular tongue along a fold line 80 to a generally right angle position and the side walls 70 may be similarly formed.

The central wall 74 may be provided with a generally circular aperture 82 and the end wall 74 may be provided with a slot 84 in general alignment therewith. A worm generally designated by the reference character 86 and comprising, for example, spiral threads 88, a generally cylindrical nose 90 at one end portion thereof, a generally cylindrical shoulder 92 at the other end portion thereof, and a head portion 94 extending generally outwardly of the shoulder 92. The head portion 94 may be provided with means, such as a screw slot 96 and hexagonal flats 98 to enable engagement thereof by a torque producing tool, such as a wrench or screwdriver. The worm screw 86 may be rotationally carried by the worm screw bracket 24 as by having the nose 90 thereof engaged within the aperture 82 and the shoulder 92 thereof engaged within the slot 84.

The worm screw bracket 24 and the worm screw 86 may, as heretofore pointed out, be pivotally associated with the main bracket 18, as by the pivot bracket 22 and pivot pin 66.

The worm screw 86 may, therefore, be moved between a position whereat the threads 88 thereof engage the teeth 60 of the worm gear 58, as shown in solid lines in FIG. 2 and a position whereat the worm thread 88 is disengaged from the teeth 60 of the worm gear 58, as shown in phantom in FIG. 2. The worm screw bracket 24 may be biased toward the thread engaging position of the worm screw 86, as by means of a pair of hairpin springs 100 disposed about the pivot pin 66 and engaging the base portion 52 of the pivot bracket 22 and the back wall 68 of the worm screw bracket 24. The back wall 68 and the side walls 70 opposite the worm screw 86 may, as illustrated, comprise a handle portion which, upon depression thereof, will release the worm threads 88 from the gear teeth 60, against the biasing of the hairpin springs 100.

The worm screw 86 may, when constructed and arranged as described above, serve at least two functions. Firstly, the worm threads 88 may function as a pawl with the teeth 60 of the worm gear 58 functioning as a ratchet to enable direct, anti-reverse windup of the straps 26 on the worm gear shaft 38 by being cammed outwardly by the gear teeth 60 so as to rotate the bracket 24 to the position shown in phantom in FIG. 2 and enable the gear teeth 60 to move transversely the worm tooth 88 when the pinion gear 58 is rotated in a strap winding direction and, secondly, by rotation of the head portion 94 of the worm screw 86 as a torque increasing, slow speed worm and pinion drive for slow speed windup and release of the straps 26. Regardless of whether the worm gear shaft 38 is rotated directly, as by the screw slot 54 for high speed windup of the straps 26 or indirectly, through rotation, for example, of the screw slot 96, the worm thread 88 functions for anti-reversal of the gear shaft 38 until the handle portion of the worm screw bracket 24 is depressed to the position shown in phantom in FIG. 2 to enable rapid release or unwinding of the straps 26.

Accordingly, by direct rotation of the gear shaft 38, a fast and rapid windup or takeup of the straps 26 may be effectuated to rapidly close the clamp 10. Finer adjustment may then be readily and easily accomplished by rotation of the worm screw 86, which fine adjustment would be continuous in range. Hence, no re-setting of the worm screw 86 is required between uses of the clamp 10, since the worm screw 86 may be tightened at any time without requiring any release between tightenings, such as would be required if ordinary screw thread fasteners were utilized for fine adjustment of the straps 26.

It may be readily seen that the worm bracket 24, therefore, may be defined as comprising a generally box-like portion 102 having end walls defined by the end wall 72 and the central wall 74 and a generally open and unobstructed side designated by the reference character 104 and a handle or manual operating means 106 disposed in general alignment therewith and extending generally perpendicularly outwardly of one of the end walls, namely the central wall 74 with the pivot pin 66 being disposed generally adjacent the intersection therebetween. It may be further seen that the hairpin springs 100 may be defined as comprising a loop portion 108 disposed about the pivot pin 66 and leg portions 110 and 112 engaging the worm bracket 24 and pivot bracket 22, respectively. The band means 12 may be further provided with generally outwardly extending means, folds or projections 114 adapted to abut the upper surface of a cylinder, or the like, to position the piston ring compressor 10 properly relative thereto during movement of the piston 14 into the bore thereof.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. Band-type clamp comprising, in combination, an elongated strap, rotatable means for engaging said strap to provide tension thereto when rotated, means for rotating said engaging means to provide a rapid slack takeup and release, gear means for rotating said engaging means at a reduced rate to provide a slower speed and higher force takeup and release and means for automatic disengagement of said gear means during direct rotation of said rotating means in a tension increasing direction wherein said disengagement means further comprises means for maintaining engagement between said rotating means and said gear means when said rotating means is not rotating in a tension increasing direction and wherein said gear means comprises a self-locking gear train to enable functioning thereof as a ratchet-type anti-reverse structure.

2. Band-type clamp comprising, in combination, an elongated strap, rotatable means for engaging said strap to provide tension thereto when rotated, means for rotating said engaging means to provide a rapid slack takeup and release and gear means for rotating said engaging means at a reduced rate to provide a slower speed and higher force takeup and release, wherein said rotatable means comprises a shaft and bearing means for supporting said shaft for rotation in generally tangential relationship with said strap, wherein said gear means comprises driven gear means operatively associated with said shaft for rotation therewith, driving gear means adapted for driving engagement with said driven gear means at a torque increasing ratio and means for enabling rotation of said driving gear means and wherein said rotating means comprises means mounted with said shaft for enabling direct rotation and means for enabling said driven gear means to overrun and rotate independently of said driving gear means in a tension-increasing direction.

3. Band-type clamp defined in claim 2 wherein an end portion of said strap is structurally associated with said shaft enabling rotation of said shaft to wind said strap end portion thereabout.

4. Band-type clamp defined in claim 3 wherein the other end portion of said strap is positioned relative to said bearing means to define a constricting type encircling band clamp.

5. Band-type clamp defined in claim 2 wherein said driving and driven gear means comprise, respectively, mating worm and pinion gears.

6. Band-type clamp defined in claim 5 further comprising a bearing bracket for fixedly positioning said bearing means and a worm bracket structurally associated with said bearing bracket for pivotal movement about an axis generally parallel the axis of said shaft, wherein said pinion gear is mounted generally concentrically with said shaft and wherein said worm shaft is mounted with said worm bracket for rotation about an axis generally perpendicular the pivot axis and generally in the plane of said pinion gear to enable pivotal movement of said worm bracket to provide engagement and disengagement of said worm and said pinion gear.

7. Band-type clamp defined in claim 6 further comprising means for biasing said worm bracket towards gear engagement to enable said worm to provide ratchet-type anti-reverse holding of said pinion gear.

8. Band-type clamp defined in claim 7 wherein said shaft is constructed and arranged to enable direct, low mechanical advantage and rapid takeup rotation thereof, said worm being constructed and arranged to enable direct rotation thereof for high mechanical advantage slow speed takeup and release rotation of said shaft and said worm bracket is constructed and arranged to enable manual movement thereof to provide gear disengagement for rapid release rotation of said shaft.

9. Band-type clamp defined in claim 2 wherein said pinion gear is disposed generally longitudinally medially of said shaft and wherein there is provided a pair of elongated straps structurally associated with said shaft on opposite sides of said pinion gear.

10. Band-type clamp defined in claim 9 particularly adapted for use as a piston ring compressor further comprising an elongated band of substantial width disposed generally interiorly of said strap and adapted to engage piston rings to transmit the constriction of said strap generally uniformly thereto, said elongated band being provided with generally outwardly extending means adapted to engage a cylinder block during piston insertion to provide positioning relative thereto.

11. A band-type clamp comprising, in combination, an elongated strap, a shaft, bearing means for supporting said shaft for rotation in generally tangential relationship with said strap for winding of said strap thereabout to provide tension thereto, means for rotating said shaft at a first ratio for enabling rapid slack takeup and release, driven gear means operatively associated with said shaft for rotation therewith, driving gear means adapted for driving engagement with said driven gear means, means for enabling rotation of said driving gear to provide a second ratio drive of said shaft for a slower speed and higher force takeup and release and means for movably mounting said driving gear means relative said bearing means to enable movement for selective engagement and disengagement between said driving and driven gear means.

12. Band-type clamp defined in claim 11 further comprising a bearing bracket, said bearing means being mounted with said bearing bracket and wherein said mounting means comprises a worm bracket mounted with said bearing bracket for pivotal movement relative thereto about an axis generally parallel and spaced apart from said shaft and of biasing said worm bracket towards gear engagement to enable rotation of said driven gear means in one direction to pivot said worm bracket toward gear disengagement to provide ratchet-like anti-reverse action.

13. Band-type clamp defined in claim 12 wherein said driving and driven gear means comprise, respectively, mating worm and pinion gears.

14. Band-type clamp defined in claim 13 further comprising manual operating means for pivoting said worm bracket towards gear disengagement for enabling rapid release of said clamp.

15. Band-type clamp defined in claim 14 wherein an end portion of said strap is structurally associated with said shaft to enable rotation of said shaft to wind said strap end thereabout.

16. Piston ring compressor comprising, in combination, an elongated band of substantial width adapted to be disposed with the ends overlapping in encircling relationship to a piston, a bearing bracket structurally associated therewith adjacent the outer end portion thereof, a shaft rotationally supported by said bearing bracket in generally spaced apart parallel relationship to said band, a pair of spaced apart generally parallel straps disposed generally externally medially of said band and secured relative thereto generally adjacent said bearing bracket with free end portions thereof being secured generally tangentially with said shaft to enable rotation of said shaft to wind said strap thereabout to constrict said band, gear means for rotating said shaft, means for enabling selective drive of said shaft directly for course adjustment, means for disengaging said gear means during such course adjustment, and means for driving said shaft at increased torque through said gear means for fine adjustment.

17. Piston ring compressor comprising, in combination, an elongated band of substantial width adapted to be disposed with the ends overlapping in encircling relationship to a piston, a bearing bracket structurally associated therewith adjacent the outer end portion thereof, a shaft rotationally supported by said bearing bracket in generally spaced apart parallel relationship to said band, a pair of spaced apart generally parallel straps disposed generally externally medially of said band and secured relative thereto generally adjacent said bearing bracket with free end portions thereof being secured generally tangentially with said shaft to enable rotation of said shaft to wind said strap thereabout to constrict said band and gear means for rotating said shaft comprising, in turn, a driven pinion gear mounted for rotation with said shaft generally between said free end portions and a worm positioned for engagement with said pinion gear for driving and locking said shaft.

18. Piston ring compressor defined in claim 17 further comprising a worm bracket for selectively movably positioning said worm in engagement with said pinion gear and disengaged therefrom to enable direct rotation of said shaft.

19. Piston ring compressor defined in claim 18 further comprising means for biasing said worm bracket towards gear engagement enabling said worm to provide ratcheting of said pinion gear.

20. Piston ring compressor defined in claim 18 wherein said worm bracket comprises a generally box-like portion having spaced apart end walls and at least one generally open and unobstructed side, said worm being rotatably carried by said end walls and accessible through said generally open and unobstructed side, and wherein there is further provided a pivot bracket positioned relative to said bearing bracket and comprising a pair of generally parallel spaced apart arms and a pivot pin extending through said arms and said worm bracket in generally parallel spaced apart relationship to said shaft, enabling said worm bracket to be pivoted about said pivot pin to enable said pinion gear to extend through said generally open and unobstructed side and into engagement with said worm.

21. Piston ring compressor defined in claim 20 wherein said worm bracket further comprises a handle portion extending generally perpendiculary of one of said end walls and in general alignment with said box-like portion, wherein said pivot pin passes through said worm bracket generally at the intersection of said box-like portion and said handle portion, wherein said biasing means comprises at least one hairpin type wire spring having a loop disposed on said pivot pin and a pair of legs extending therefrom and engaging said pivot and worm brackets, respectively, and wherein said pivot bracket arms extend generally outwardly of said bearing bracket, straps and band, enabling inward rocking movement of said handle portion to provide outward rocking movement of said box-like portion.

22. Piston ring compressor defined in claim 21 wherein said bearing bracket comprises a pair of inner generally ring-like bearing portions disposed on opposite sides of said pinion gear and extending generally between said pinion gear and said straps and a pair of outer generally ring-like bearing portions disposed adjacent the outside edges of said straps to thereby securely position said shaft and straps relative to said bearing bracket.

23. Piston ring compressor defined in claim 17 wherein at least one end portion of at least one of said shafts and said worm is constructed and arranged to enable torque transmitting engagement thereof with at least one of a screwdriver and a wrench.

24. Machine for enabling the application of constricting, constraining, restraining, tensioning, moving or like forces to an object, apparatus, structure, assembly or the like comprising, in combination, a bracket; elongated means having at least a portion thereof adapted to be disposed relative to such object, apparatus, structure, assembly, or the like, for the transmission of force thereto and at least another portion thereof adapted for movement relative to said bracket; and multiple ratio means structurally and operatively associated with said bracket and said elongated means for enabling the selective exertion of forces to said elongated means tending to induce movement thereof relative to said bracket, said multiple ratio means comprising, in turn, shaft means rotatably mounted with said bracket for pulling said elongated means during rotation thereof, means for enabling direct rotation of said shaft means, a pinion gear mounted for rotation with said shaft, a driving gear mounted for selective engagement and disengagement with said pinion gear and means for driving said driven gear for reduced rate and increased torque rotation of said shaft means, enabling said machine to selectively transmit, maintain and release such constricting, constraining, restraining, tensioning, moving or like forces to such object, apparatus, structure, assembly, or the like.

* * * * *